Figure 1:
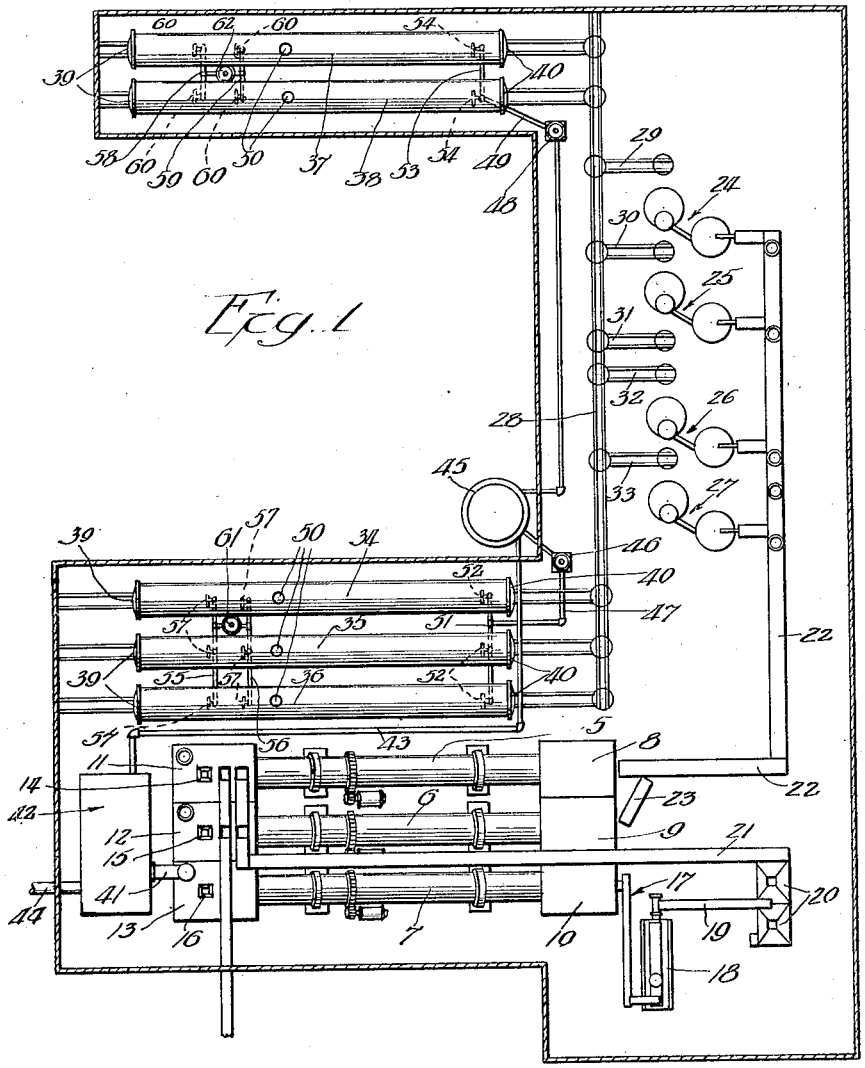

Dec. 9, 1924.

F. EUWECKE 1,518,842

PROCESS AND APPARATUS FOR THE MANUFACTURE OF STONE LIKE MATERIAL

Filed May 9, 1921    2 Sheets-Sheet 1

Inventor:
Frank Euwecke

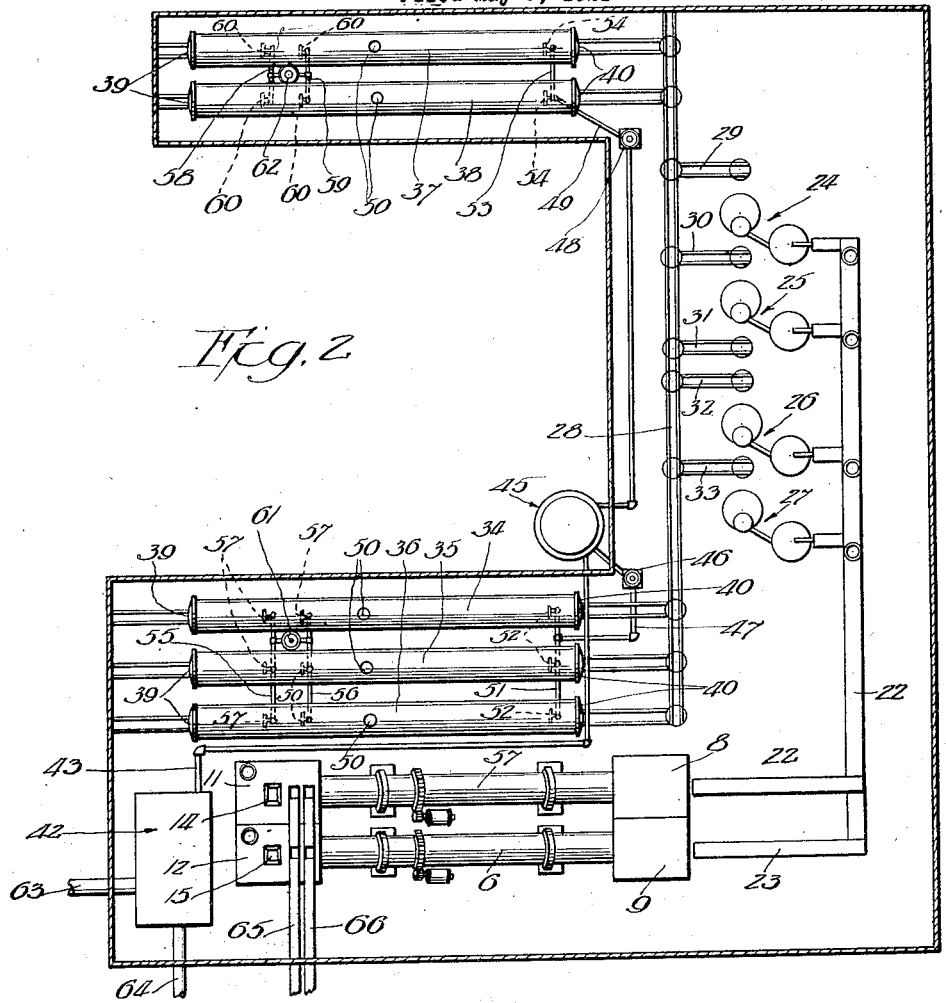

Patented Dec. 9, 1924.

1,518,842

UNITED STATES PATENT OFFICE.

FRANK EUWECKE, OF CHICAGO, ILLINOIS, ASSIGNOR TO SILICA BRICK & ENGINEERING COMPANY, OF CHICAGO, ILLINOIS, A CORPORATION OF ILLINOIS.

PROCESS AND APPARATUS FOR THE MANUFACTURE OF STONELIKE MATERIAL.

Application filed May 9, 1921. Serial No. 468,016.

*To all whom it may concern:*

Be it known that I, FRANK EUWECKE, having declared my intention of becoming a citizen of the United States, residing at Chicago, in the county of Cook and State of Illinois, have invented certain new and useful Improvements in Processes and Apparatus for the Manufacture of Stonelike Material, of which the following is a specification.

The present invention has to do with certain improvements in processes for the manufacture of stone like material, and also has to do with the apparatus used in the practice of said process.

The stone like material herein referred to may take the form of bricks or building blocks, or pavement blocks, or pottery, or any other suitable form; but as a matter of convenience in description, and in order to simplify the present specification, I will frequently refer to the process and apparatus as being used in connection with the manufacture of bricks. I wish it understood, however, at the outset, that the term "bricks" or other similar terms as thus used are used largely in an illustrative manner, and to simplify this specification, and that I do not use such terms in a limiting manner except as I may so use them in the claims.

Bearing the foregoing in mind, one of the features of the present invention has to do with a process and apparatus whereby it is possible to produce a very high grade of brick with the use of slag, tailings, or by-products of smelters, as one of the important raw materials going into the manufacture of the product. It has for a long time been recognized that on account of the enormous quantities of furnace slag produced in this country and elsewhere, and on account of the fact that the disposition of this slag has in many cases become a serious commercial problem, it would be very desirable from many standpoints to be able to use this slag in manufacturing brick or other building material. The nature of this problem from a commercial standpoint may be emphasized by the statement that the amount of furnace slag produced annually in the United States would probably more than suffice to manufacture all of the building brick used in this country if a suitable process and apparatus should be devised to make possible the satisfactory use of this slag.

It has in the past been known to produce brick from slag; but as far as I am aware all previous processes for accomplishing this result have depended upon the casting of the molten slag into suitable forms, the resulting brick or building materials being nothing more nor less than hardened slag with all of the attendant disadvantages and objections; or have involved the use of a simple steaming process, in which case the brick have not attained either the strength, durability, or fine appearance of the brick made by the present process.

One of the features of the present invention relates to a process and the apparatus therefor whereby it is possible to provide an extremely hard and durable brick having many of the characteristics of hard limestone but wherein by far the largest percentage of the total mass is made up of slag or similar material. More particularly, in this connection, another object is to provide a process which will eventually join the particles of slag to the limestone, so as to provide a very homogeneous and durable product.

Another feature of the invention relates to improvements whereby it is possible to very materially shorten the time required for the practice of the process, so that the daily capacity of a given installation of machinery and plant will be correspondingly increased and its earning capacity raised. At the same time the practice of this feature of the invention results in a substantial improvement in the structure and physical properties of the bricks themselves.

More particularly, in this connection I may state that the shortening of time necessary for the manufacture of the brick is accomplished largely by hastening the "aging" action. The action of carbon dioxide gas on the calcium oxide results in the production of limestone, but where the carbon dioxide of the atmosphere is relied on for this action, it necessarily follows that the "aging" action itself is very slow and is irregular. One of the features of the present invention is the provision of a process and apparatus therefor in which the aging action is greatly hastened and is rendered perfectly controllable by the operator as to the amount and the conditions under which it is performed. This feature relates to the provision of the aging action as a distinct artificial step of a process which is under the control of the operator.

Another feature of the invention has to do with the provision of a process and the apparatus therefor whereby the cost of manufacture of the brick may be very greatly reduced, so that in fact it will be possible under ordinary commercial conditions to produce the brick for about one-third of the usual and ordinary cost of manufacture of ordinary building brick. In this connection, I sometimes avail myself of one of the earlier steps of the process for the generation of the carbon dioxide gas which is used in the aging operation, so that said gas is made available at practically no cost over and above the cost necessary to practice the remaining portions of the process. In this way, a tremendous saving in the cost of manufacture is effected, besides which a useful disposition is made of the carbon dioxide gas which would in some cases be a by-product of the process. On the other hand, under certain conditions the carbon dioxide gas may be obtained as a by-product of other processes and in such cases may also be obtained at practically no cost as far as the process of manufacturing the brick themselves is concerned.

Briefly stated, my present process consists in the artificial hardening of the brick or other forms, by the artificial application of $CO_2$ gas thereto, under such conditions as to pressure, time, temperature, etc., and under such control of the operator, that the lime portions of the brick will be converted into limestone in a very expeditious manner, and in such a way that the operator will have it within his power to complete the aging process within a very short time, and will be able to bring the brick into a completely aged condition during the process. In this way the operator will not only be able to shorten the aging time to a fraction of the time which would have been required under natural conditions, but he will be able to ensure a complete aging of the brick or other forms, a result which could only be attained after an indefinite lapse of time under conditions of nature, and a result which in some cases might never be reached if the aging of the brick were to depend on the action of the $CO_2$ gas contained in the natural air.

The exact conditions of the application of the $CO_2$ gas during my aging process will depend somewhat on the composition of the brick before the aging commences, and will also depend somewhat on the composition and physical properties which it is desired to impart to the completed product. Ordinarily, however, it will be desired to subject the brick to the action of $CO_2$ gas under a pressure of about 140 pounds per square inch, and for a period of about three hours. The temperature of the brick and gas during this aging action may be "normal", that is, about 70° Fah. although in some cases it may be desired to raise the temperature. The application of the $CO_2$ gas will result in the conversion of certain of the lime portions of the brick into limestone. Some of those portions of the brick which were, prior to the aging action, in the form of calcium oxide, CaO, will be converted into calcium carbonate, $CaCO_3$, by the reaction, CaO plus $CO_2$ equals $CaCO_3$. Some of those portions of the brick which were, prior to the aging action, in the form of calcium hydroxide $Ca(OH)_2$, will be converted into calcium carbonate, $CaCO_3$, with the liberation of water, $H_2O$, by the reaction, $Ca(OH)_2$ plus $CO_2$ equals $CaCO_3$ plus $H_2O$.

By applying the $CO_2$ gas under pressure, and with the absence of air, the operator has it within his power to ensure the most intimate contact of the $CO_2$ gas with each and every portion of the lime constituents of the brick so that he can ensure a very complete and rapid conversion of the same into limestone.

In a more limited sense, my present invention contemplates the use of this aging action on the lime portion of the brick, in conjunction with the use of slag as the body of the brick, so that only a relatively small proportion of lime will be needed, and so that the good physical properties of the slag may be taken advantage of in the completed brick themselves. In such case the lime portion of the brick will serve the function of a binder or cementing agent to assist in binding together the particles of slag into a homogeneous integral structure.

The binder action of the lime may be performed either by a direct union of the lime with the slag particles by what may be compared to a welding action; or it may be secured by surrounding the slag particles with a continuous net work of lime material; or it may be performed in both of these manners. In the first case the union between the lime and slag will partake largely of a chemical combination; and in the second case the strength of the binding action will depend mostly on the effectiveness with which the net work of lime is completed up around the particles of slag.

The nature of the cementing action which occurs by a chemical union of lime and slag material will depend largely on the chemical composition of slag itself.

The chemical composition of furnace slag will vary within considerable limits, but a typical composition of ordinary blast furnace slag is as follows: silica, $SiO_2$, about 35%; alumina, AlO$_2$, about 14–16%; calcium oxide, CaO, about 25–35% (sometimes known as dead lime); miscellaneous about 20%. Another typical composition is as follows: Fe, .30%; Mn, .40%; Al$_2$O$_3$, 12.55%; CaO, 45.40%; SiO$_2$, 37.10%; Mg, 3.40%; and S, 1.20%. It is observed that ordinarily the silica, SiO$_2$, constitutes a very substantial percentage of the total, generally more than one-third. The slag compositions previously enumerated are known as ordinary slag. As another example of a slag which may be used according to this process I will mention the following analysis: silica, SiO$_2$, 35%; calcium oxide, CaO, 38%; manganese, 13%, alumina Al$_2$O$_3$, 6%; the balance being miscellaneous matters. This is known as a manganese slag.

The calcium oxide or lime content of ordinary slag is some times stated to be "dead," whereas the lime portion of the manganese slag is generally not in this condition. As a result the lime portion of the manganese slag will generally react directly with the CO$_2$ gas in the hardening process, whereas, in the case of an ordinary slag it is generally necessary to add a supplemental portion of lime to react with the CO$_2$ gas during the hardening process.

The silica, SiO$_2$, and calcium hydroxide, Ca(OH)$_2$, will react together to produce hydrated calcium silicate by the following reaction: Ca(OH)$_2$ plus SiO$_2$ equals CaSiO$_3$(H$_2$O). This calcium silicate is formed at the surface of contact between the lime particles and the slag particles and in effect serves to weld them together. This reaction may be brought about by "burning" a mixture of granulated slag and calcium and hydrated lime in the desired proportions, the burning generally being performed in a reverberatory furnace, in which the mixture is subjected to the direct action of the flame.

The relative proportion of lime which it is necessary to use in the case of an ordinary slag will depend somewhat upon the original composition of said slag and the strength or physical characteristics desired in the brick; but ordinarily substantially 95% of common slag by weight and substantially 5% of calcined and hydrated lime by weight will be used. These will be intimately mixed together and passed through the reverberatory furnace, or other apparatus.

In the case of either the manganese slag without the addition of lime or ordinary slag with the addition of lime, the material burned in the reverberatory furnace will be delivered from said furnace at a temperature of substantially 350° Fah.

After the slag and lime have been burned together they should be formed while still hot into the brick or other shapes. This may be done in presses and at a temperature of approximately 200° Fah. The plant in such case may be laid out so that the material will be conveyed directly from the furnace to the presses, the operation being so timed that the proper intermediate cooling action will deliver the material to the presses at the desired temperature.

After the bricks have been shaped in the presses they are subjected to the aging action of the CO$_2$ gas. This will ordinarily be done in tanks of sufficient size to accommodate one or more industrial cars loaded with the brick, the tanks being of sufficient strength to withstand a gas pressure of upwards of 140 pounds per square inch.

The aging process serves to convert any calcium hydroxide and calcium oxide into limestone corresponding to the reactions hereinbefore explained. This will permanently harden the lime portions of the brick, bringing them at once into a final condition which could only be attained in the atmosphere after a lapse of a great length of time and even then without any certainty that the maximum amount of conversion into limestone has been secured.

In order to expedite the action and to ensure the most complete penetration of the carbon dioxide gas into all portions of the brick, all of the air should be removed and all of the space occupied by the CO$_2$ gas. In some cases it will be desirable to use an exhauster for first withdrawing the air. In such case the carbon dioxide gas will afterwards be admitted to the tank without the admission of air so that the gas will be compelled to penetrate the body of the brick in a very perfect manner. In other cases, the air may be removed from the tank and from the brick simply by displacement of the carbon dioxide gas, the natural penetrative qualities of the carbon dioxide gas being relied on to ensure contact of said gas with the lime of the brick and to ensure the desired reaction. Where this displacement action is availed of it is desirable to place a vent valve in the top of the tank through which the air may be allowed to escape, the carbon dioxide gas being introduced at the bottom of the tank. Owing to its higher specific gravity the carbon dioxide gas will in such case displace the air through the vent valve, the air staying above the carbon dioxide gas and floating on the same until finally all of the air has been displaced. Then the vent valve may be closed and by further introduction of carbon dioxide gas the desired gas pressure may be established within the tank.

Ordinarily the aging operation will be conducted under a carbon dioxide gas pressure of 140 pounds per square inch, and for a period of approximately three hours, and at the normal temperature of approximately 70° Fah. when treating building brick of ordinary size.

The $CO_2$ gas used in the operation may be secured in any suitable manner or from any suitable source. It will be noted that during the manufacture of the calcined lime there will be given off a substantial proportion of $CO_2$ gas. This $CO_2$ gas may be collected and used in the aging process and when this is done, the $CO_2$ gas used in the aging process is secured at practically no cost over and above what would otherwise have been necessary for the calcining of the lime.

In other cases the $CO_2$ gas may be secured from other sources. For example, if the brick plant be located near a steel or iron mill in which is produced the slag, it may be possible to secure the $CO_2$ gas as a by-product from the blast or other furnaces of said mill. In this case the $CO_2$ gas is secured practically without cost over and above the installation necessary to transport it to the brick plant.

In another instance the $CO_2$ gas may be secured as a by product from the operation of the roasting furnace within which the slag and lime are burned together. If these furnaces be fired with coke, for example, a high percentage of $CO_2$ gas will be generated which may be recovered and used in the aging process.

In those cases in which the $CO_2$ gas for the aging process is derived from the original burning of the limestone the various reactions may be summarized as follows:

The burning of the limestone, $CaCO_3$ gives calcium oxide, $CaO$, and carbon dioxide gas $CO_2$. The hydrating of the calcium oxide, $CaO$, with water, $H_2O$, gives calcium hydroxide, $Ca(OH)_2$. The burning of the calcium hydroxide, $Ca(OH)_2$, with the silica, $SiO_2$ gives calcium silicate, $$CaSiO_3(H_2O).$$

During the subsequent aging operation limestone, $CaCO_3$ is produced by the union of $CO_2$ gas with any unconsumed calcium oxide, $CaO$, and with any unconsumed calcium hydroxide $Ca(OH)_2$.

It is to be observed at this point that in the previously explained reactions the silica of the slag enters into the burning operation. Physically the slag serves to supply most of the body of the brick. In some cases, however, a similar brick and a similar process might be invoked by the use of other material than slag for the body, when such other material carries a substantial percentage of silica and alumina.

In order that the process and apparatus of the present invention may be more readily understood, reference may be had to the accompanying drawings in which—

Fig. 1 shows a plan view of a typical brick plant capable of practicing the present process, and which plant is equipped with the necessary apparatus for burning the line with consequent production of $CO_2$ gas which is subsequently used in the aging process; and Fig. 2 shows a plan view of a modified arrangement of plant which is adapted to receive $CO_2$ gas from an outside source, as for example, from the gases of blast or other furnaces, the calcined and hydrated lime also being delivered from another source.

Referring first to the layout shown in Fig. 1, I have illustrated three reverberatory furnaces 5, 6, and 7. All of these furnaces are tilted upwardly from their right hand ends toward their left hand ends, so that the left hand ends are at the greatest elevation. The burners for these furnaces are illustrated diagrammatically at 8, 9 and 10, respectively. The left hand ends of the furnaces, which are the highest ends, lead into the hoods 11, 12 and 13. These hoods are provided with hoppers 14, 15 and 16 by means of which they are charged with the material to be burned.

The furnace 7 is intended for burning the limestone, and the furnaces 5 and 6 are intended for burning the mixture of slag and lime. The limestone is charged into the hopper 16 of the furnace 7 and works its way down through said furnace towards the right and against the flame. The burned lime is finally delivered onto a conveyer 17 which in turn leads to the hydrater 18 wherein the burned lime is hydrated, or slacked. From the hydrater 18 the slacked lime is carried by a conveyer 19 to one or more mixers 20 where the lime is mixed with the granulated slag in the desired proportions, for example, ninety-five per cent slag and five per cent by weight of hydrated lime From the mixers 20 the slaked lime is carried by a conveyer 21 to the hoppers 14 and 15 of the burners 5 and 6. In these burners the material works its way downwards toward the right and against the flame. The burned material from the furnace 5 is taken onto a conveyer 22, and the burned material from the furnace 6 is taken onto a conveyer 23 by which it is carried to the conveyer 22 and is transported in common with the material from the furnace 5. I have illustrated two of the furnaces for burning the lime and slag mixture and only a single furnace for burning the lime, since in ordinary practice one lime burning furnace will be ample to supply the requirements of a number of the slag burning furnaces. The capacity of the lime and slag burning furnaces may in other cases be equalized by the use of furnaces of different sizes or having different capacities.

The hot material from the slag burning furnace is carried by the conveyer 22 to one or more molding machines 24, 25, 26 and 27 in which the material is pressed while still hot into the desired forms such as bricks. The material thus formed may be stacked on small industrial cars working on a track 28 with branch tracks 29, 30, 31, 32 and 33 reaching to the different molding machines. These industrial cars serve as a convenient means for transporting the pressed brick to the chambers in which the aging process is conducted.

In Fig. 1, I have shown five of these aging chambers designated respectively 34, 35, 36, 37 and 38. As a matter of convenience, the aging chambers 34, 35, and 36 are grouped together at one point and the chambers 37 and 38 at another point.

Each of these aging chambers is shown as comprising a horizontal tank of suitable size to receive a number of industrial cars loaded with the bricks. Removable heads 39 and 40 may be provided to permit the cars to be run into one end of each chamber and out of the other end, so that the aging process may be conducted in a regular and fairly continuous manner in each chamber, the general direction of movement of the industrial cars being away from the molding machines, through the aging chambers, and out of the plant.

In each aging chamber the brick or other forms are to be subjected to the action of carbon dioxide gas. In the particular layout of Fig. 1 this carbon dioxide gas is a by product of the lime burning operation conducted in the furnace 7. The hood 13 of this furnace connects by a pipe 41 with suitable apparatus designated diagrammatically by the numeral 42 wherein the carbon dioxide gas is separated from the other gases such as nitrogen, the carbon dioxide gas being delivered through the pipe 43 and the other gases through the pipe 44.

The pipe 43 leads to a gas holder 45 of suitable capacity. Carbon dioxide gas may be drawn from this holder by a pump 46 and compressed to the desired pressure and delivered through a pipe 47 for the aging chambers 34, 35, and 36, and other carbon dioxide gas may be drawn from the holder 45 by a pump 48 and delivered through the pipe 49 for the aging chambers 37 and 38.

In the top of each aging chamber is an air vent valve 50 which when opened permits the air to be discharged from such chamber while the carbon dioxide gas is being introduced from below. A common pipe 51 leads from the pipe 47 into the bottoms of the aging chambers 34, 35, and 36, valves 52 controlling the delivery of carbon dioxide into these chambers. In like manner a common pipe 53 leads from the pipe 49 into the bottom portions of the aging chambers 37 and 38, valves 54 controlling the delivery of carbon dioxide into said chambers.

When any particular aging chamber is to be filled with carbon dioxide gas under pressure its vent valve 50 is first opened and the proper valve 52 is opened if fresh carbon dioxide gas is to be used. It is to be noted, however, that after the aging process has been completed in any given chamber, there will probably remain a considerable amount of carbon dioxide gas in said chamber unabsorbed by the brick. Said gas, if any, may be used for a subsequent aging operation. For this purpose, I have provided cross connecting pipes 55 and 56 joining together the lower portions of the chambers 34, 35 and 36, with suitable valves 57 interposed between said cross connecting pipes and the respective tanks. In like manner I have provided cross connecting pipes 58 and 59 beneath the aging chambers 37 and 38 with valves 60 for controlling their connections to the respective tanks. A pump 61 connected between the pipes 55 and 56 makes it possible to draw carbon dioxide gas from any of the aging chambers 34, 35, or 36 and transfer it to another one of said chambers under pressure; and the pump 62 interposed between the pipes 58 and 59 makes it possible to draw carbon dioxide gas from either of the aging chambers 37 and 38 and transfer it to the other of said chambers under pressure.

When these cross connections and said pumping mechanisms are provided they may be used to transfer the unconsumed gas from an aging chamber wherein the aging process is completed to another chamber wherein the process is commencing, and any additional amount of carbon dioxide gas needed for such newly commenced operation may be supplied from the holder 45. In this way practically 100 per cent of the carbon dioxide gas may be used, and it is unnecessary to waste any substantial portion thereof into the atmosphere notwithstanding the fact that heavy pressures are used in the aging tanks.

In the layout shown in Fig. 2, the lime burning furnace has been eliminated, since in this case it is intended that the burned lime shall be received from a source outside of the plant, and is also intended that the carbon dioxide gas shall come from a source outside of the plant. I have, therefore, illustrated the gas separating outfit 42 as receiving raw gas containing carbon dioxide through a pipe 63, the separated carbon dioxide gas being delivered through the pipe 43 to the gas holder 45, and the separated gas being discharged from the plant through the pipe 64. In this case, I have also illustrated the conveyers 65 and 66 for bringing in the slag and the lime for the furnaces 5 and 6.

It was previously mentioned that the relative proportions of slag and lime may be varied within wide limits. The size of the slag particles may also be varied within wide limits, but it will ordinarily be desirable to use granulated slag of which substantially 100 percent will pass a 30 mesh screen. In this connection, it will generally be desirable to use proportions of granulated slag and lime such as to reduce the percentage of voids of the mixture to a minimum prior to the burning operation.

While I have herein mentioned certain temperatures and certain compositions of material and certain proportions or percentages, still it will be understood that I do not intend to limit myself to these temperatures or compositions of material or proportions or percentages except as I may do so in the claims.

I claim:

1. The process for the manufacture of brick or shaped building material which consists in burning limestone for the production of calcium oxide and carbon dioxide gas, hydrating the calcium oxide for the production of calcium hydroxide, burning and delivering at a temperature of substantially 350° Fah. a mixture composed of substantially five per cent by weight of said calcium hydroxide and ninety-five per cent by weight of granulated slag containing a substantial percentage of silica, molding said burned material to the desired shape at a temperature of substantially 200° Fah., and subjecting the molded material with a substantial absence of air to the action of carbon dioxide gas which was produced in the first stages of the process, at a pressure of substantially one-hundred-forty pounds per square inch and a temperature of substantially 70° Fah., for a period of substantially three hours, substantially as described.

2. The process for the manufacture of brick or shaped building material which consists in burning limestone for the production of calcuim oxide and carbon dioxide gas, hydrating the calcium oxide for the production of calcium hydroxide, burning and delivering at a temperature of substantially 350° Fah. a mixture composed of substantially five per cent by weight of said calcium hydroxide and ninety-five per cent by weight of granulated slag containing a substantial percentage of silica, molding said burned material to the desired shape at a temperature of substantially 200° Fah., and subjecting the molded material with a substantial absence of air to the action of carbon dioxide gas at a pressure of substantially one-hundred-forty pounds per square inch and a temperature of substantially 70° Fah. for a period of substantially three hours, substantially as described.

3. The process for the manufacture of brick or shaped building material which consists in preparing calcium hydroxide, burning and delivering at a temperature of substantially 350° Fah. a mixture composed of substantially five per cent by weight of said calcium hydroxide and ninety-five per cent by weight of granulated slag containing a substantial percentage of silica, molding said burned material to the desired shape at a temperature of substantially 200° Fah., and subjecting the molded material with a substantial absence of air to the action of carbon dioxide gas at a pressure of substantially one-hundred-forty pounds per square inch and a temperature of substantially 70° Fah. for a period of substantially three hours, substantially as described.

4. The process for the manufacture of brick or shaped building material which consists in preparing calcium hydroxide, burning and delivering at a temperature of substantially 350° Fah. a mixture of said calcium hydroxide and granulated slag containing a substantial percentage of silica, molding said burned material to the desired shape at a temperature of substantially 200° Fah., and subjecting the molded material with a substantial absence of air to the action of carbon dioxide gas at a pressure of substantially one-hundred-forty pounds per square inch and a temperature of substantially 70° Fah. for a period of substantially three hours, substantially as described.

5. The process for the manufacture of brick or shaped building material which consists in preparing calcium hydroxide, burning and delivering at a temperature of substantially 350° Fah. a mixture composed of said calcium hydroxide and granulated slag containing a substantial percentage of silica, molding said burned material to the desired shape at a temperature of substantially 200° Fah., and subjecting the molded material with a substantial absence of air to the action of carbon dioxide gas at a pressure of substantially one-hundred-forty pounds per square inch for a period of substantially three hours, substantially as described.

6. The process for the manufacture of brick or shaped building material which consists in preparing calcium hydroxide, burning a mixture composed of said calcium hydroxide and granulated slag containing a substantial percentage of silica, molding such burned material to the desired shape, and subjecting the molded material with a substantial absence of air to the action of the carbon dioxide gas at a pressure of substantially one-hundred-forty pounds per square inch for the desired length of time, substantially as described.

7. The process for the manufacture of brick or shaped building material which consists in preparing calcium hydroxide with the generation of carbon dioxide as a by-product, burning a mixture of said calcium hydroxide and granulated slag containing a substantial percentage of silica, molding said material to the desired shape, and subjecting the molded material with a substantial absence of air to the action of a portion of said carbon dioxide gas, substantially as described.

8. The process for the manufacture of brick or shaped building material which consists in preparing a mixture of calcium hydroxide and granulated slag containing a substantial percentage of silica, and in the ratio of substantially five percent of calcium hydroxide and ninety-five percent of slag, burning and delivering said mixture at a temperature of substantially 350° Fah., molding said burned material to the desired shape at a temperature of substantially 200° Fah., and subjecting the molded material with a substantial absence of air to the action of carbon dioxide gas at a pressure of substantially one-hundred-forty pounds per square inch, substantially as described.

9. The process for the manufacture of brick or shaped building material which consists in preparing a mixture of calcium hydroxide and granulated slag containing a substantial percentage of silica, burning and delivering said mixture at a temperature of substantially 350° Fah., molding said material to the desired shape at a temperature of substantially 200° Fah., and subjecting the molded material with a substantial absence of air to the action of carbon dioxide gas at a pressure of substantially one-hundred-forty pounds per square inch, substantially as described.

FRANK EUWECKE.